(12) United States Patent
Sawai et al.

(10) Patent No.: US 7,774,803 B2
(45) Date of Patent: Aug. 10, 2010

(54) DISK LOADING APPARATUS

(75) Inventors: Kunio Sawai, Daito (JP); Kazumasa Nasu, Daito (JP); Katsuya Sakagami, Daito (JP)

(73) Assignee: Funai Electric Co., Ltd. (JP)

( * ) Notice: Subject to any disclaimer, the term of this patent is extended or adjusted under 35 U.S.C. 154(b) by 591 days.

(21) Appl. No.: 11/882,844

(22) Filed: Aug. 7, 2007

(65) Prior Publication Data

US 2008/0052736 A1  Feb. 28, 2008

(30) Foreign Application Priority Data

Aug. 25, 2006  (JP) .............................. 2006-229736

(51) Int. Cl.
*G11B 17/04* (2006.01)
(52) U.S. Cl. ...................................... 720/625
(58) Field of Classification Search ........................ None
See application file for complete search history.

(56) References Cited

U.S. PATENT DOCUMENTS

| | | | | |
|---|---|---|---|---|
| 6,941,564 B2 * | 9/2005 | Shimozaki | ................. | 720/620 |
| 6,944,873 B2 * | 9/2005 | Huang | ........................ | 720/704 |
| 6,973,661 B2 * | 12/2005 | Kanada et al. | .............. | 720/633 |
| 6,983,471 B2 * | 1/2006 | Suzuki | ........................ | 720/620 |
| 7,353,523 B2 * | 4/2008 | Kido | ........................... | 720/626 |
| 7,356,825 B2 * | 4/2008 | Makisaka et al. | ........... | 720/626 |
| 7,576,946 B2 * | 8/2009 | Fujisawa | ................. | 360/99.06 |

FOREIGN PATENT DOCUMENTS

| JP | 07-010842 U | 2/1995 |
|---|---|---|
| JP | 8007433 | 1/1996 |
| JP | 9044954 | 2/1997 |
| JP | 11-144353 | 5/1999 |
| JP | 2002-150650 | 5/2002 |
| JP | 2004-046913 | 2/2004 |
| JP | 2004-095113 | 3/2004 |

* cited by examiner

*Primary Examiner*—Mark Blouin
(74) *Attorney, Agent, or Firm*—Bacon & Thomas, PLLC (57) ABSTRACT

There is provided a disk loading apparatus capable of improving the stability in the centering operation at low cost only by changing the shape of the guide groove without adding extra parts or complicated structures. The disk loading apparatus includes a feed roller 2, a disk arm 4 adapted to move back and forth between an initial position where a disk 100 that is drawn by the feed roller 2 is received and a retracted position that corresponds to a chucking position for the disk, and a guide groove 5. The feed roller 2 has a function of centering the disk 100. The guide groove 5 includes slant wall surfaces 57 with the groove width therebetween decreasing progressively in the retracting direction of the disk arm 4, and receiving surfaces 58 for limiting the tilt angle of the disk arm 4.

8 Claims, 12 Drawing Sheets

DISK LOADING APPARATUS

BACKGROUND OF THE INVENTION

1. Field of the Invention

The present invention relates to disk loading apparatuses and, in particular, to a slot-in type disk loading apparatus adapted to load a disk inserted through a slot onto a chucking position under the centering action of a feed roller.

2. Description of the Related Art

Figure 9:
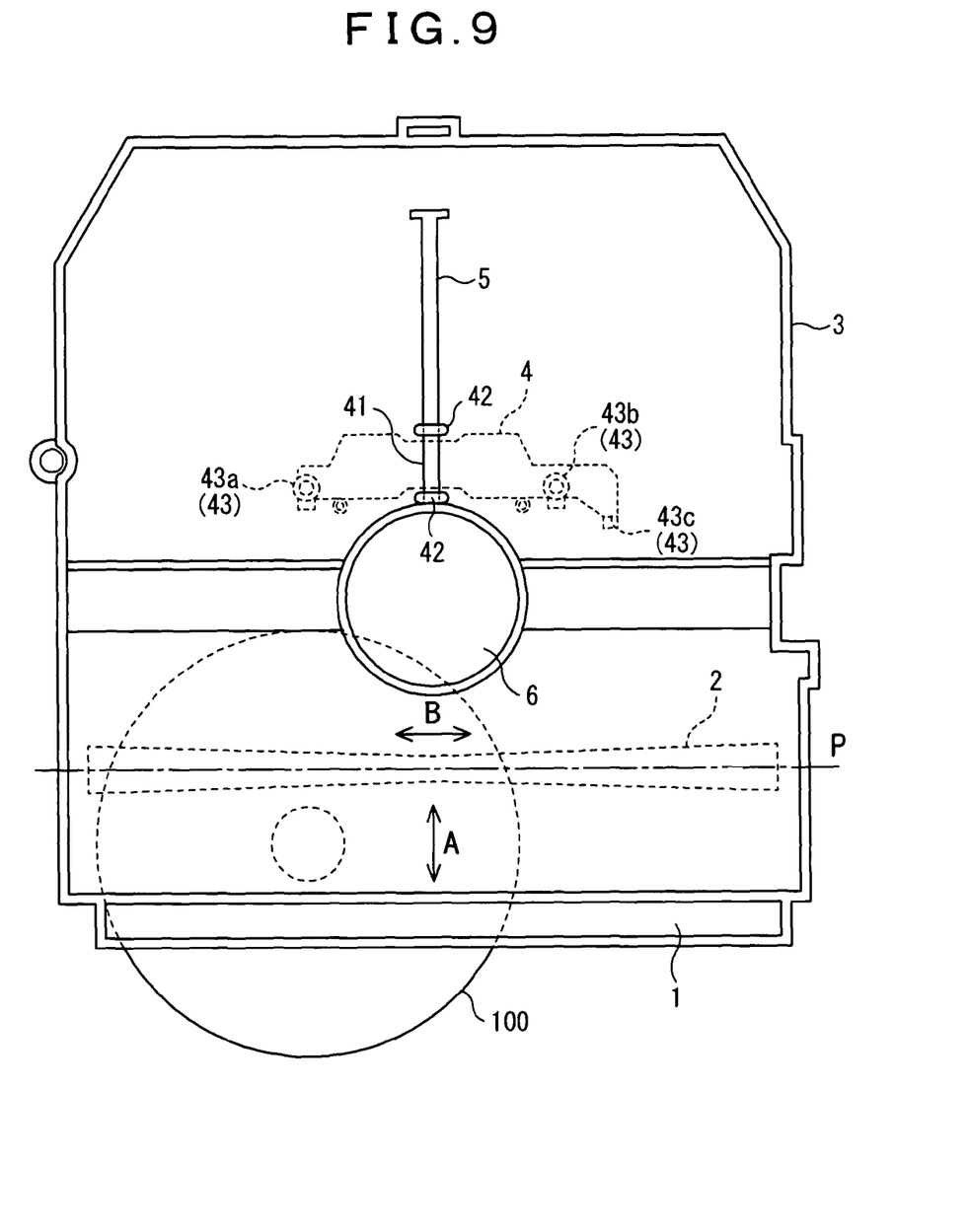
FIG. 9 is a schematic configuration view at the beginning stage of loading.
Figure 10:
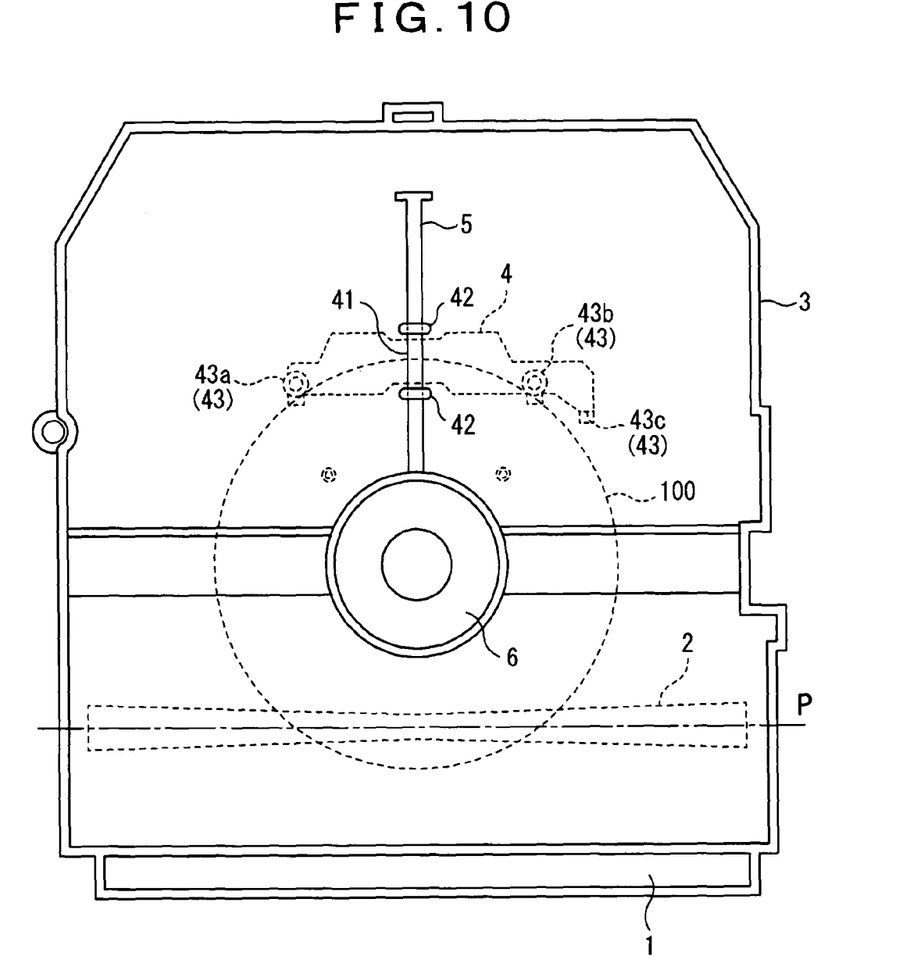
FIG. 10 is a schematic configuration view at the termination stage of loading.

FIGS. 9 and 10 schematically show the basic configuration of this kind of disk loading apparatus, where FIG. 9 is a schematic configuration view at the beginning stage of loading where a disk 100 is inserted through a slot 1 and FIG. 10 is a schematic configuration view at the termination stage of loading where the disk 100 is loaded and arranged on a chucking position.

In this disk loading apparatus, the normal rotation of a feed roller 2 that is installed in the vicinity of the slot 1 draws the disk 100 inserted through the slot 1 onto the chucking position, while the reverse rotation of the feed roller 2 feeds the disk 100 out of the chucking position to eject through the slot 1. Also, the feed roller 2 is formed in an hourglass shape with a diameter increasing from the center thereof in the axial direction as shown in the drawings. The feed roller 2 is adapted to rotate in contact with one surface of the disk 100 to give the disk 100 a feed force in the drawing and ejecting direction A that is perpendicular to the axis P of the feed roller 2 and to fulfill a centering function of moving the disk 100 toward the center of the feed roller 2 in the axial direction as indicated by the arrow B.

Meanwhile, a disk arm 4 is mounted on the inside of the top of the chassis 3 correspondingly to the feed roller 2. The disk arm 4 is adapted to move back and forth between an initial position (advanced position as shown in FIG. 9) where the disk 100 that is drawn through the slot 1 by the normal rotation of the feed roller 2 is received and a retracted position (as shown in FIG. 10) that corresponds to the chucking position for the disk 100, and the back-and-forth movement is guided by a straight guide groove 5 formed in the chassis 3. Specifically, an elongated convex engaging body 41 formed integrally with the disk arm 4 is engaged slidably with the guide groove 5 that has a uniform groove width over the entire effective length. The engaging body 41 is adapted to slide in the guide groove 5 in the longitudinal direction so that the disk arm 4 moves back and forth between the initial position shown in FIG. 9 and the retracted position shown in FIG. 10.

Between the disk arm 4 and the feed roller 2, there is an installation space 6 for a turntable (not shown in the drawings) attached to the chassis 3 via a motor (not shown in the drawings), and a clamper (not shown in the drawings) is arranged in a position facing the installation space 6. The disk 100 that is drawn onto the chucking position is chucked at a right position by the cooperation of the turntable arranged in the installation space 6 and the clamper, and in this state, the turntable is driven rotationally together with the disk 100.

In addition, the chucking operation for the disk 100 by the cooperation of the turntable and the clamper is interlocked with the retracting operation of the disk arm 4, while the chucking release operation for the disk 100 by the cooperation of the turntable and the clamper is interlocked with the advancing operation of the disk arm 4 via an interlocking system not shown in the drawings.

That is, in a disk loading mode, the turntable and the clamper are in the chucking release position so that the disk 100 is received between them in a retracting step where the disk arm 4 is pushed in from the initial position shown in FIG. 9 toward the retracted position shown in FIG. 10 by the push-in operation of the disk 100 that is drawn by the feed roller 2. Then, a chucking step by the cooperation of the turntable and the clamper begins when the disk 100 is drawn onto the chucking position between the turntable and the clamper and the disk arm 4 arrives at the retracted position shown in FIG. 10. Then, with the beginning of the chucking step, the disk arm 4 is further retracted away from the disk 100, and the feed roller 2 is retracted away from the surface of the disk 100. On the contrary, in a disk unloading mode, with the termination of the step of moving the turntable and the clamper to the chucking release position, the feed roller 2 is brought into contact with the surface of the disk 100 in the chucking position to eject the disk 100 through the slot 1, and then the disk arm 4 is advanced to the initial position shown in FIG. 9 through the retracted position shown in FIG. 10

Figure 11:
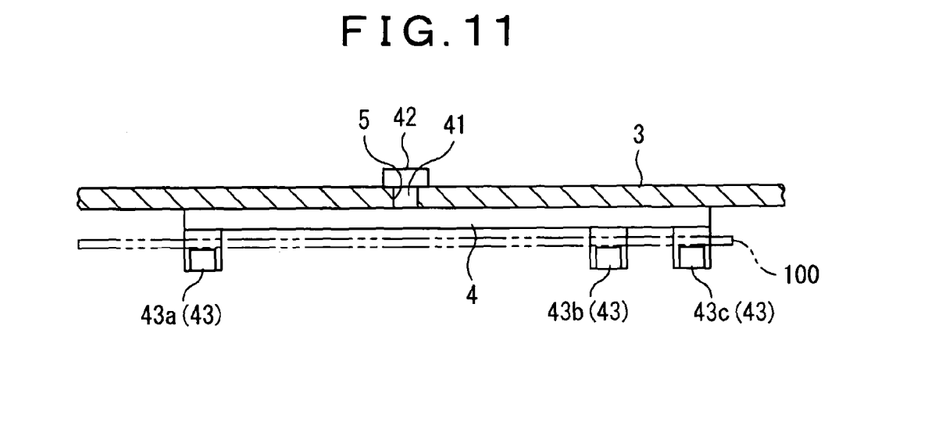
FIG. 11 is a vertical cross-sectional front view schematically showing the mounting structure of the disk arm onto the chassis.

FIG. 11 is a vertical cross-sectional front view schematically showing the mounting structure of the disk arm 4 onto the chassis 3. As shown in this drawing, the engaging body 41 included in the disk arm 4 is engaged slidably with the guide groove 5 in such a manner as not to jolt heavily, where the engaging body 41 includes a retaining piece 42 for preventing the disk arm 4 from dropping out of the chassis 3, and the disk arm 4 includes disk receiving portions 43 for catching two parts on the outer peripheral surface of the disk 100 that is indicated by the alternate long and short dash line to receive the disk 100. It is noted that in FIG. 11, a common disk receiving portion 43a is provided in one part on one side in the width direction of the disk arm 4, and inner and outer disk receiving portions 43b and 43c are provided in two parts on the other side in the width direction of the disk arm 4. This is for the reason that small-diameter disks (8 cm disks) can be received by a part or all of the common, inner, and outer disk receiving portions 43a, 43b, and 43c, while large-diameter disks (12 cm disks) can also be received by the common and inner disk receiving portions 43a and 43b. Therefore, the exemplary disk loading apparatus shown in the drawing can use both small-diameter disks and large-diameter disks separately.

In disk loading apparatuses having such a basic configuration as described with reference to FIGS. 9 and 10, since both small-diameter disks and large-diameter disks can be used separately, the width of the slot 1 and the length of the feed roller 2 are determined to suit the diameter of large-diameter disks. Therefore, small-diameter disks, in particular, are not always inserted at the center of the slot 1, but often inserted at a left- or right-biased position.

Figure 12:
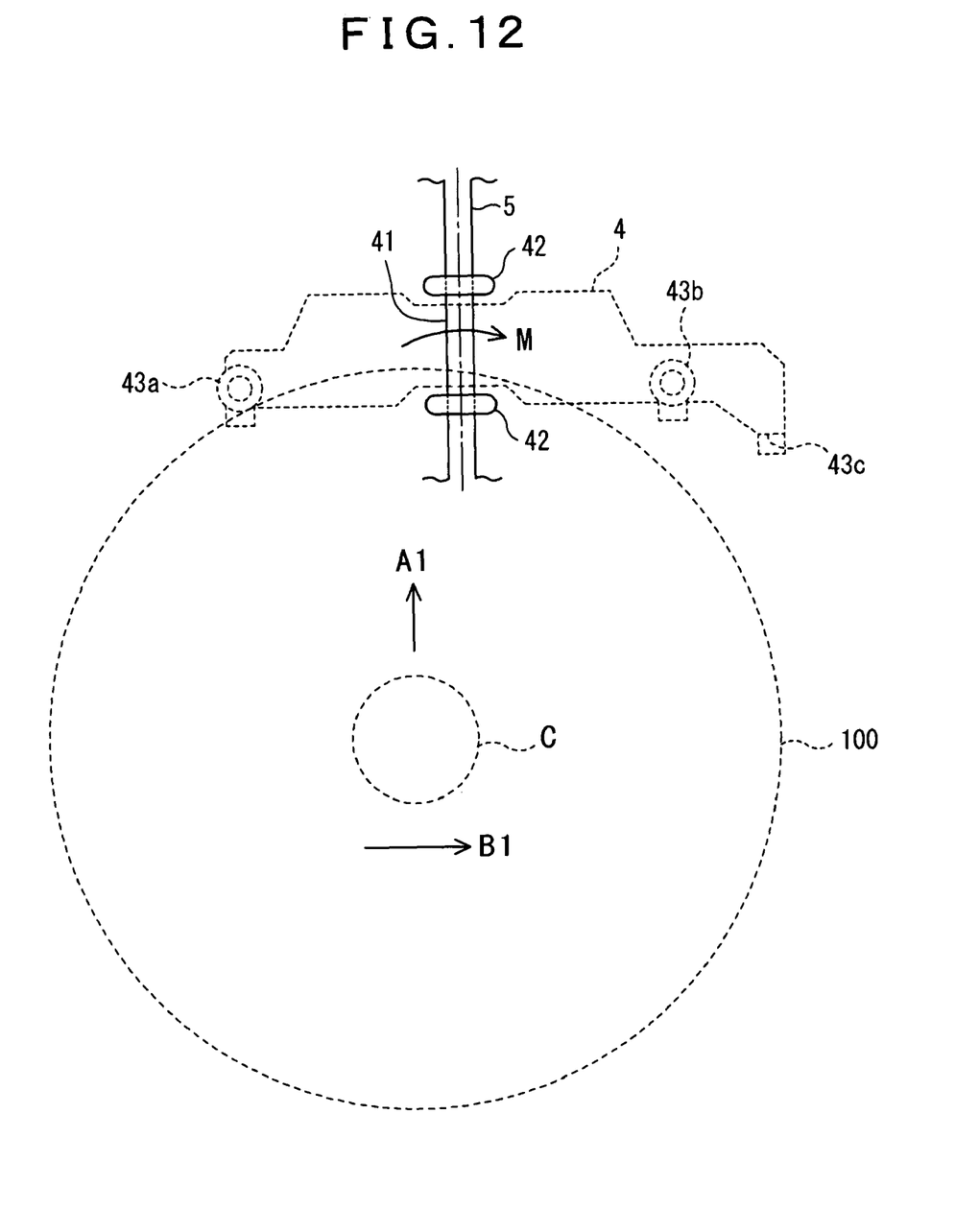
FIG. 12 is an illustrative view showing the positional relationship between the disk arm and a disk.
Figure 13:
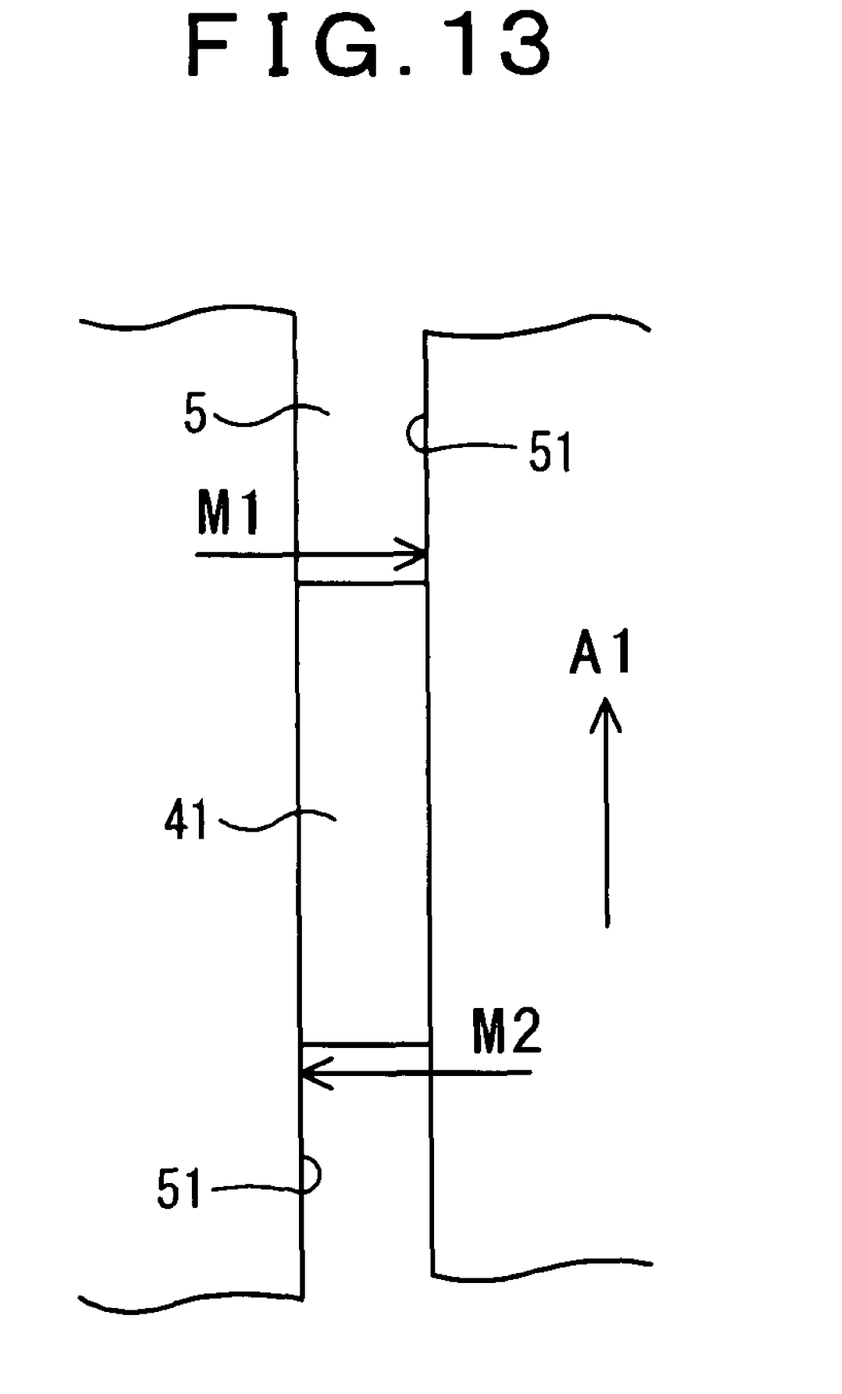
FIG. 13 is an illustrative view showing interactions between the engaging body and the guide groove.

FIGS. 12 and 13 illustrate a centering action for a disk (small-diameter disk) 100 inserted at such a biased position, where FIG. 12 illustrates the positional relationship between the disk arm 4 and the disk 100 and FIG. 13 illustrates interactions between the engaging body 41 and the guide groove 5. The centering action will hereinafter be described with reference to FIGS. 9 to 13.

The disk 100 inserted through the slot 1 at a biased position is drawn in the direction indicated by the arrow A1 in FIG. 12 by the feed roller 2 that rotates normally in contact with the surface of the disk as shown in FIG. 9, and then the outer peripheral surface of the disk runs into only the common disk receiving portion 43a of the disk arm 4 in the initial position and not come into contact with the disk receiving portion 43b or 43c, whereby the push-in operation of the disk 100 is applied to a biased portion of the disk arm 4. Therefore, the disk arm 4 is subject to a torque (indicated by the arrow M in FIG. 12) around the engaging body 41 that is engaged slidably with the guide groove 5, and then as shown in FIG. 13, one end of the engaging body 41 is pressed against one wall surface 51 of the guide groove 5 as indicated by the arrow Ml, while the other end of the engaging body 41 is pressed against the other wall surface 52 of the guide groove 5 as indicated by the arrow M2, resulting in an increase in the sliding resistance of the engaging body 41 against the guide groove 5. This causes the disk arm 4 to be retracted while the disk 100 drawn by the feed roller 2 and the disk arm 4 are pressed against each other, and the centering function of the feed roller 2 during the retracting step causes the disk 100 to move in the centering direction indicated by the arrow B1 in FIG. 12. When this centering action positions the center of the disk 100 on the extension C of the center line of the guide groove 5, the torque M disappears and the centering function of the feed roller 2 is disabled. This shows that the disk 100 can be drawn accurately onto the chucking position shown in FIG. 10 only if the disk 100 and the disk arm 4 are pressed against each other when the disk arm 4 is retracted and thereby the centering function of the feed roller 2 is exhibited normally.

Meanwhile, as for mechanisms of loading optical disks, there has been proposed a technique for correcting the position of a disk by bringing the disk into contact with a tapered shaft (refer to Japanese Patent Laid-Open Publication No. Hei 8-7433 for example). As for the separate usage of 8 cm disks and 12 cm disks in disk players, there has also been proposed a technique in which the position of a centering lever is variable so that the right position of each disk with respect to a turntable can be determined separately based on the operation of the centering lever (refer to Japanese Patent Laid-Open Publication No. Hei 9-44954 for example). There has further been proposed a technique for allowing disk reproducing apparatuses to be thinned even if the disk reproducing apparatuses may employ a structure of using both small-diameter disks and large-diameter disks separately (refer to Japanese Patent Laid-Open Publication No. 2004-46913 for example).

Meanwhile, in accordance with the disk loading apparatus described with reference to FIGS. 9 to 13, the disk 100 can be drawn accurately onto the chucking position shown in FIG. 10, as mentioned above, only if the disk 100 and the disk arm 4 are pressed against each other when the disk arm 4 is retracted and thereby the centering function of the feed roller 2 is exhibited normally.

However, in this disk loading apparatus, since the pressing between the disk 100 and the disk arm 4 during the step of retracting the disk arm 4 depends on the sliding resistance of the engaging body 41 against the wall surfaces 51 and 52 of the guide groove 5, the pressing state may not appear normally if the engaging body 41 is worn away, for example. Alternatively, the pressing state may not also appear normally for some reasons. Therefore, there has been a problem in that even if the feed roller 2 may have a centering function, disks may not be loaded accurately onto the chucking position due to the loss of the stability in the centering operation. Particularly, in the disk loading apparatus capable of using both large-diameter disks and small-diameter disks separately, since the displacement of small-diameter disks for normal centering is greater than that of large-diameter disks, the above-described problem is more likely to occur when using small-diameter disks.

On the other hand, the technique proposed in Japanese Patent Laid-Open Publication No. Hei 8-7433 is achieved by adding extra parts and complicated structures, which cannot improve the stability in the centering operation at low cost. Also, neither of the techniques proposed in Japanese Patent Laid-Open Publication Nos. Hei 9-44954 and 2004-46913 directly concerns the centering of disks.

SUMMARY OF THE INVENTION

The present invention has been made in consideration of the above-described problems and circumstances, and an object thereof is to provide a disk loading apparatus capable of improving the stability in the centering operation at low cost only by changing the shape of the guide groove without adding extra parts or complicated structures while directly employing the basic structure of the disk loading apparatus described with reference to FIGS. 9 and 10.

A disk loading apparatus according to the present invention includes: a feed roller selectively controlled between a normal rotation for drawing a disk inserted through a slot and a reverse rotation for ejecting the disk through the slot; a disk arm adapted to move back and forth between an initial position where the disk that is drawn by the normal rotation of the feed roller is received and a retracted position that corresponds to a chucking position for the disk; and a straight guide groove for sliding an engaging body included in the disk arm to guide the back-and-forth movement of the disk arm. The feed roller has a centering function of moving the disk that is received by the disk arm in the axial direction of the feed roller while pressing the disk against the disk arm, and the disk arm is adapted to be retracted from the initial position to the retracted position by the push-in operation of the disk that is given a feed force by the feed roller.

Then, the guide groove is partitioned into an initial part that corresponds to the engaging body in the disk arm positioned in the initial position and a principal part, the initial part including slant wall surfaces with the groove width therebetween decreasing progressively in the retracting direction of the disk arm and the engaging body including locking parts to be locked against the slant wall surfaces, and the disk arm in the initial position being adapted to receive the disk that is drawn by the feed roller at a biased position and thereby to be tilted from the neutral state so that the locking parts are pressed against the slant wall surfaces, and receiving surfaces adapted to come into contact with the engaging body to limit the tilt angle of the disk arm when the disk arm is tilted from the neutral state with the engaging body are provided continuously from the slant wall surfaces.

In accordance with the thus arranged disk loading apparatus, when a disk inserted through the slot is drawn by the normal rotation of the feed roller and received by the disk arm in the initial position at a biased position, the drawing action of the feed roller causes the disk to push a biased portion of the disk arm and thereby the disk arm is subject to a torque around the engaging body. This causes the disk arm to be tilted from the neutral state so that the locking parts in the engaging body are pressed against the slant wall surfaces of the initial part in the guide groove. When the engaging body is thus pressed against the slant wall surfaces in the guide groove, the locking parts are kept locked against the slant wall surfaces so that the disk arm is not retracted or the sliding resistance of the engaging body increases prominently, even if the drawing action of the feed roller may cause the disk to push the disk arm in the retracting direction. As a result, the pressing state between the disk that is given a force in the drawing direction by the feed roller and the disk arm appears normally and therefore the centering function of the feed roller can also be exhibited normally and stably. Meanwhile, when the disk is centered by the centering function of the feed roller, the disk arm returns to the neutral state and the locking parts in the engaging body are released from the slant wall surfaces, so that the disk arm starts to be retracted by the push-in operation of the disk that is given a feed force by the feed roller and the disk is drawn onto the chucking position accurately.

The present invention also employs an arrangement that receiving surfaces adapted to come into contact with the engaging body to limit the tilt angle of the disk arm when the disk arm is tilted from the neutral state with the engaging body are provided continuously from the slant wall surfaces, which exhibits a particularly preferable effect as described below. That is, the feeding function and centering function of the feed roller are exhibited more effectively as the width of a portion of the feed roller that faces the disk (hereinafter referred to as "contact width") increases. Also, since the disk has a circular shape, the contact width of the feed roller against the disk increases as the contact portion of the feed roller against the disk comes closer to the center of the disk. Hence, if the engaging body is adapted to come into contact with the receiving surfaces so that the tilt angle of the disk arm is limited as in the present invention, the tilt angle of the disk arm can be kept small so that the amount of drawing of the disk is reduced when the disk that is drawn by the feed roller is received at a biased portion of the disk arm. Therefore, the feeding function and centering function of the feed roller can be exhibited effectively by increasing the contact width of the feed roller against the disk.

The present invention may employ an arrangement that in the guide groove, the groove width of the initial part is greater than that of the principal part, the slant wall surfaces are provided at the juncture between the principal part and the initial part, and the groove wall surfaces in the initial part that run parallel to the groove wall surfaces in the principal part are formed as the receiving surfaces. Employing this arrangement allows the slant wall surfaces and the receiving surfaces to be included easily in the guide groove.

In the present invention, the engaging body preferably has a convex shape elongated in the longitudinal direction of the guide groove. Also, the centering function of the feed roller is preferably for moving the disk so that the center of the disk is positioned on the extension of the center line of the principal part in the guide groove. In accordance with these aspects, the stability in the centering operation can be improved only by changing the shape of the guide groove in the disk loading apparatus described with reference to FIGS. 9 and 10.

The disk loading apparatus according to the present invention is further specified by employing the following arrangements. That is, the disk loading apparatus includes: a feed roller selectively controlled between a normal rotation for drawing a disk inserted through a slot and a reverse rotation for ejecting the disk through the slot; a disk arm adapted to move back and forth between an initial position where the disk that is drawn by the normal rotation of the feed roller is received and a retracted position that corresponds to a chucking position for the disk; and a straight guide groove for sliding an engaging body included in the disk arm to guide the back-and-forth movement of the disk arm. The feed roller has a centering function of moving the disk that is received by the disk arm in the axial direction of the feed roller while pressing the disk against the disk arm, and the disk arm is adapted to be retracted from the initial position to the retracted position by the push-in operation of the disk that is given a feed force by the feed roller. In the disk loading apparatus, the guide groove is partitioned into an initial part having a large groove width that corresponds to the engaging body in the disk arm positioned in the initial position and a principal part having a groove width smaller than that of the initial part, slant wall surfaces are provided at the juncture between the principal part and the initial part, the groove width between the slant wall surfaces decreasing progressively in the retracting direction of the disk arm, and the engaging body has a convex shape elongated in the longitudinal direction of the guide groove and locking parts to be locked against the slant wall surfaces are formed at a predetermined position in the longitudinal direction of the engaging body, the disk arm in the initial position being adapted to receive the disk that is drawn by the feed roller at a biased position and thereby to be tilted from the neutral state so that the locking parts are pressed against the slant wall surfaces, and further the groove wall surfaces in the initial part that run parallel to the groove wall surfaces in the principal part being adapted to come into contact with the engaging body to limit the tilt angle of the disk arm when the disk arm is tilted from the neutral state with the engaging body. Also, in the disk loading apparatus, the centering function of the feed roller is for moving the disk so that the center of the disk is positioned on the extension of the center line of the principal part in the guide groove. Operations of the present invention will be described in detail with reference to the embodiments below.

As described heretofore, in accordance with the present invention, the stability in the centering operation can be improved at low cost only by mainly changing the shape of the guide groove without adding extra parts or complicated structures while directly employing the basic structure of the disk loading apparatus described with reference to FIGS. 9 and 10. This allows the loading performance of disk loading apparatuses capable of using both large-diameter disks and small-diameter disks separately, and therefore, the stability in the chucking operation after loading to be improved. Accordingly, if such a disk loading apparatus is applied in, for example, DVD players or DVD recorders, users can enjoy stable images and also there is no possibility that faulty loading would cause damages to disks.

DESCRIPTION OF THE PREFERRED EMBODIMENTS

Figure 1:
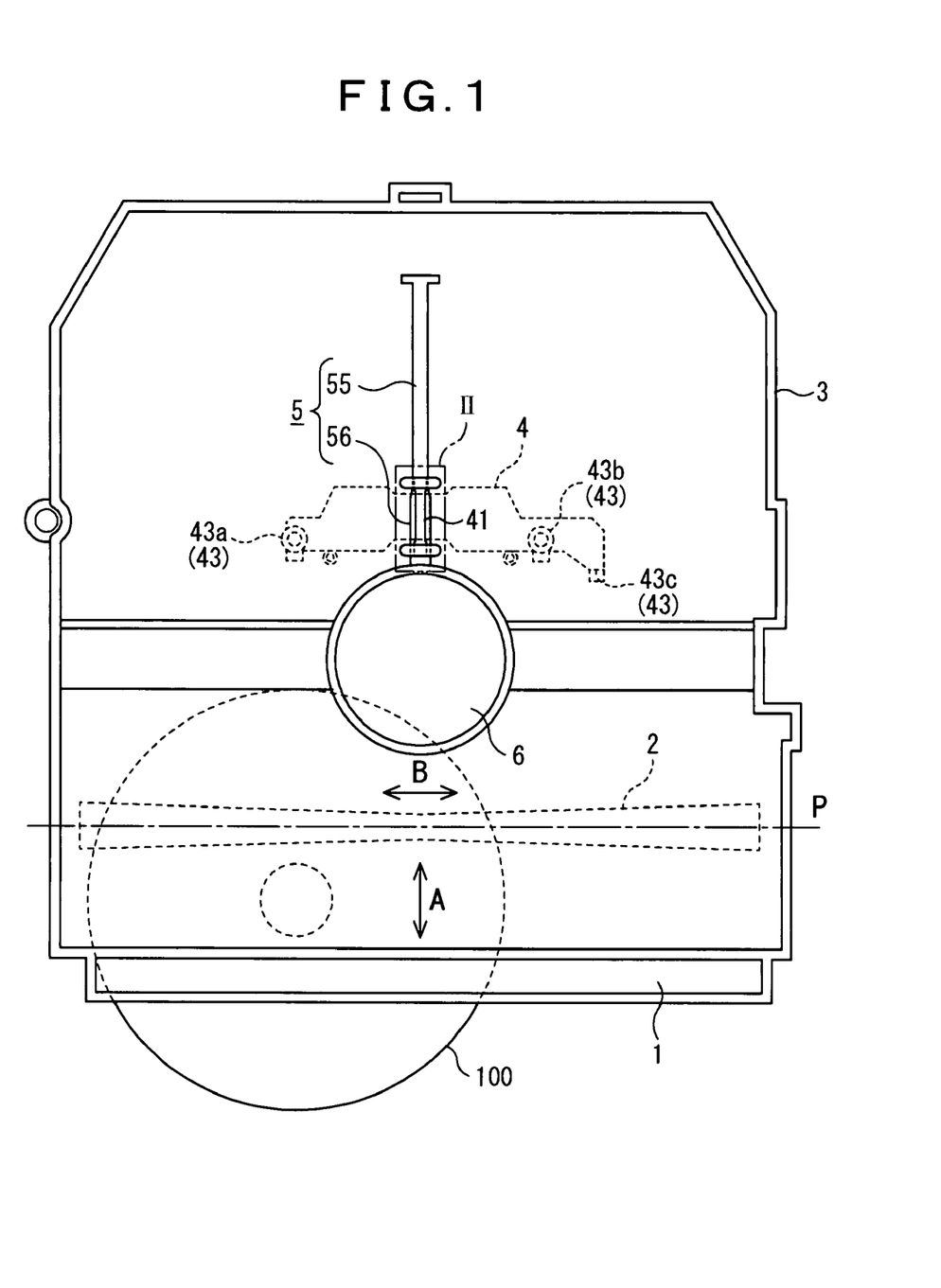
FIG. 1 is a schematic configuration view at the beginning stage of loading in a disk loading apparatus according to an embodiment of the present invention.

FIG. 1 is a schematic configuration view at the beginning stage of loading in a disk loading apparatus according to an embodiment of the present invention.

The basic configuration of the disk loading apparatus shown in FIG. 1 is the same as that of the disk loading apparatus described with reference to FIG. 9, etc. That is, in this disk loading apparatus, the normal rotation of a feed roller 2 that is installed in the vicinity of a slot 1 draws a disk 100 onto a chucking position, while the reverse rotation of the feed roller 2 feeds the disk 100 out of the chucking position to eject through the slot 1. The arrow A indicates the drawing and ejecting direction. Also, the feed roller 2 is formed in an hourglass shape with a diameter increasing from the center thereof in the axial direction. The feed roller 2 is adapted to rotate in contact with one surface of the disk 100 to fulfill a centering function of moving the disk 100 toward the center in the axial direction, i.e., in the centering direction. Further, a disk arm 4 is mounted on the chassis 3, and the disk arm 4 is adapted to move back and forth between an initial position (as shown in FIG. 1 or 9) and a retracted position (as shown in FIG. 10) that corresponds to the chucking position for the disk 100. The back-and-forth movement is guided by an engaging body 41 in the disk arm 4 sliding in a straight guide groove 5 formed in the chassis 3.

In addition, between the disk arm 4 and the feed roller 2, there is an installation space 6 for a turntable (not shown in the drawings), and a clamper (not shown in the drawings) is arranged in a position facing the turntable that is installed in the installation space 6. The disk 100 that is drawn onto the chucking position is chucked at a right position by the cooperation of the turntable and the clamper, and in this state, the turntable is driven rotationally together with the disk. Further, the chucking operation for the disk 100 by the cooperation of the turntable and the clamper is interlocked with the retracting operation of the disk arm 4, while the chucking release operation for the disk 100 by the cooperation of the turntable and the clamper is interlocked with the advancing operation of the disk arm 4 via an interlocking system not shown in the drawings.

In the present embodiment, the guide groove 5 is partitioned into an initial part 56 having a large groove width and a principal part 55 having a groove width smaller than that of the initial part 56, and when the disk arm 4 is positioned in the initial position, the engaging body 41 is positioned in the initial part 56.

Figure 2:
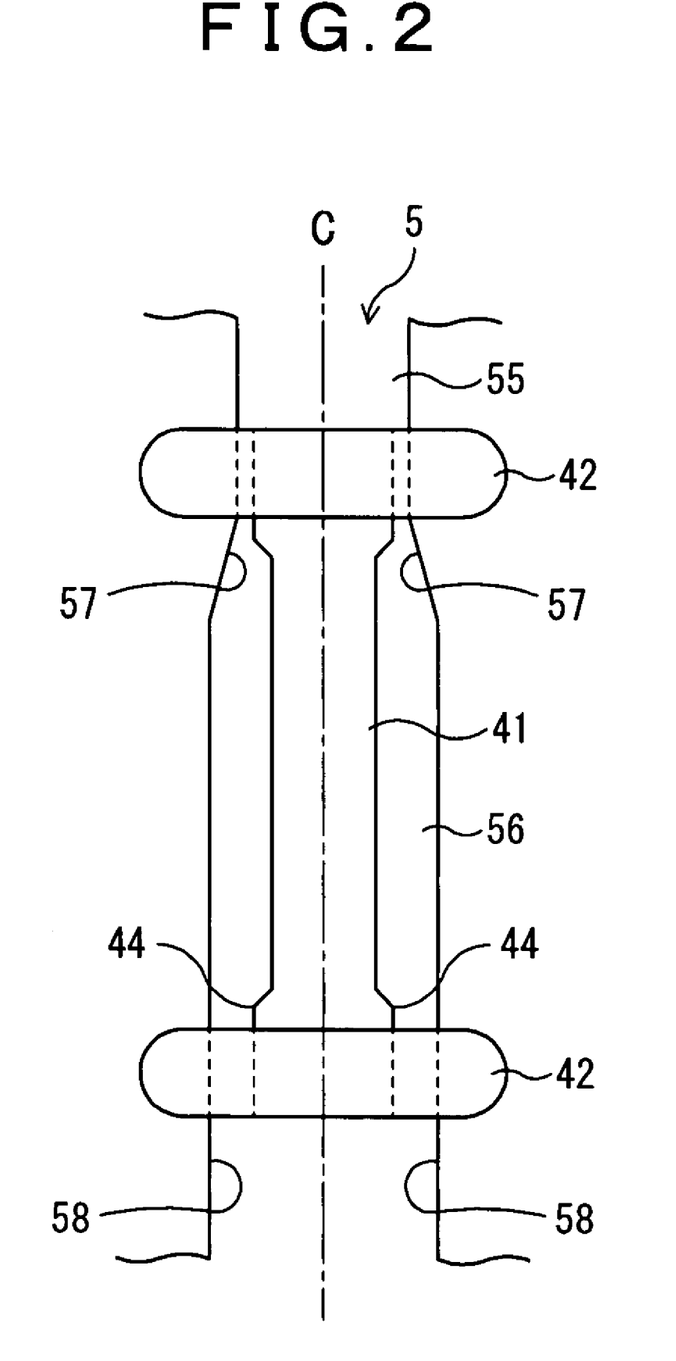
FIG. 2 is an enlarged view of the portion II of FIG. 1.

FIG. 2 is an enlarged view of the portion II of FIG. 1. As shown in this drawing, slant wall surfaces 57 are provided at the juncture between the principal part 55 and the initial part 56, the groove width between the slant wall surfaces 57 decreasing progressively in the retracting direction of the disk arm 4 (in the drawing direction of the disk). On the other hand, the engaging body 41 has a convex shape elongated in the longitudinal direction of the guide groove 5, and locking parts 44 to be locked against the slant wall surfaces 57 are formed in a stepwise manner in the vicinity of the front end of the engaging body 41. Also, receiving surfaces 58 adapted to come into contact with the engaging body 41 to limit the tilt angle of the disk arm 4 when the disk arm 4 is tilted from the neutral state, i.e., unloaded state with the engaging body 41 are formed by the groove wall surfaces in the initial part 56 that run parallel to the groove wall surfaces in the principal part 55. The configuration of the guide groove 5 described herein can be explained in other words, that is, the initial part 56 and the principal part 55, which are formed in a partitioned manner in the guide groove 5, have their respective groove widths constant at any position in the longitudinal direction, and the receiving surfaces 58, which are formed by the groove wall surfaces in the initial part 56 having a width slightly greater than that of the principal part 55, are provided continuously from the groove wall surfaces in the principal part 55 via the slant wall surfaces 57 that are formed at the juncture between the initial part 56 and the principal part 55. Then, the shape of the thus arranged guide groove 5 can be obtained easily only by partially changing the shape of the guide groove 5 described with reference to FIG. 9, etc. without adding extra parts. The locking parts 44 can also be included easily in the engaging body 41 in the disk arm 4 only by changing the shape of the engaging body 41 shown in FIG. 9, etc. without adding extra parts.

In the present embodiment, the other arrangements are the same as in the disk loading apparatus described with reference to FIG. 9 or 10. Therefore, identical or corresponding parts are designated by the same reference numerals.

Figure 3:
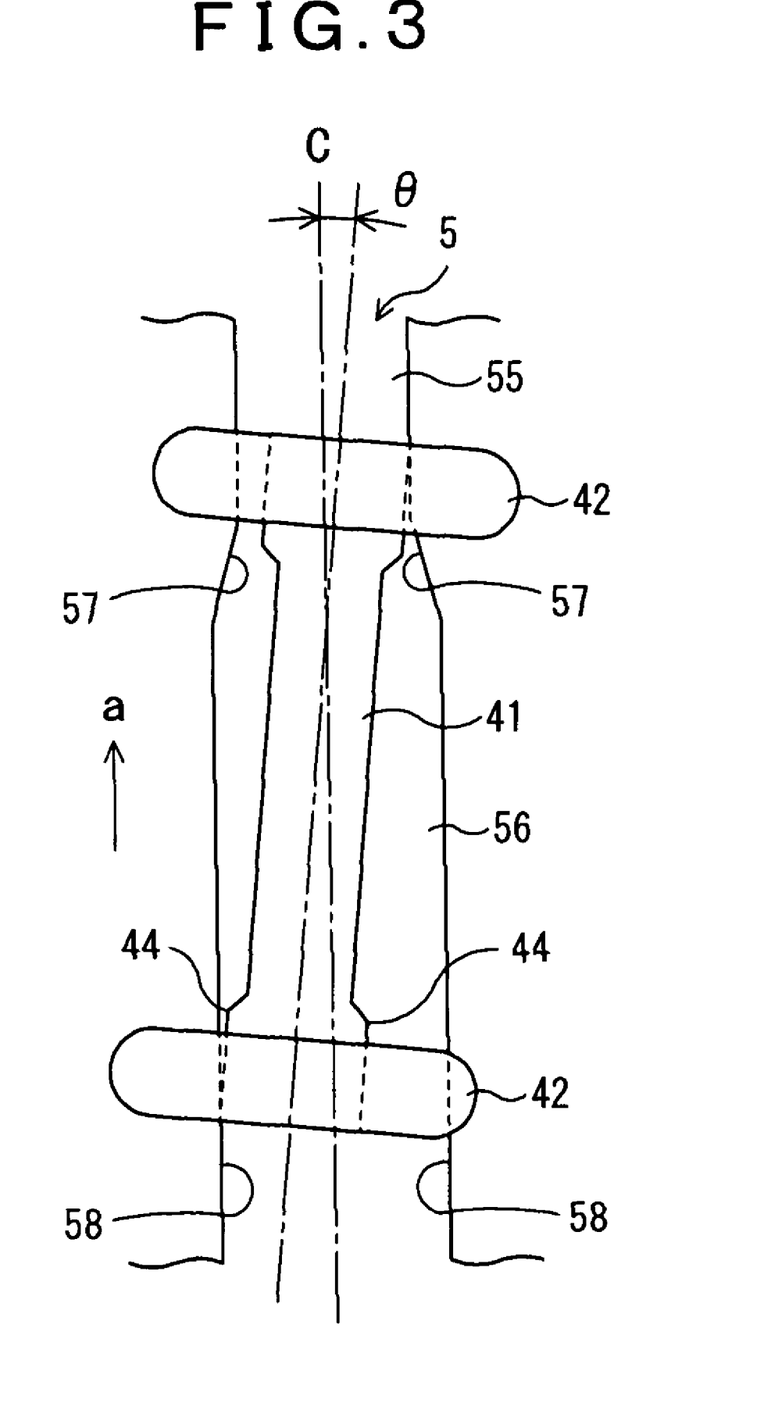
FIG. 3 is an illustrative view showing a state where the engaging body is tilted in the initial part in the guide groove.
Figure 4:
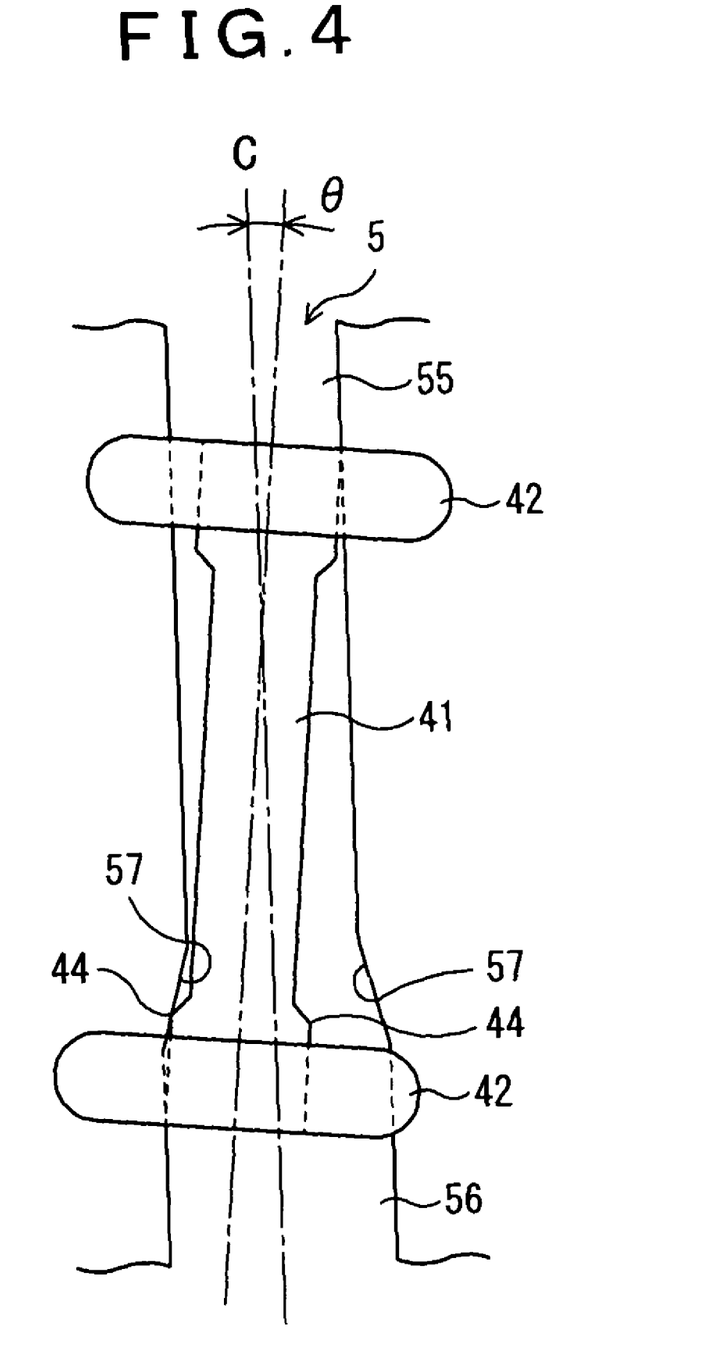
FIG. 4 is an illustrative view showing a state where the engaging body slides while being tilted to be pressed against one slant wall surface.
Figure 5:
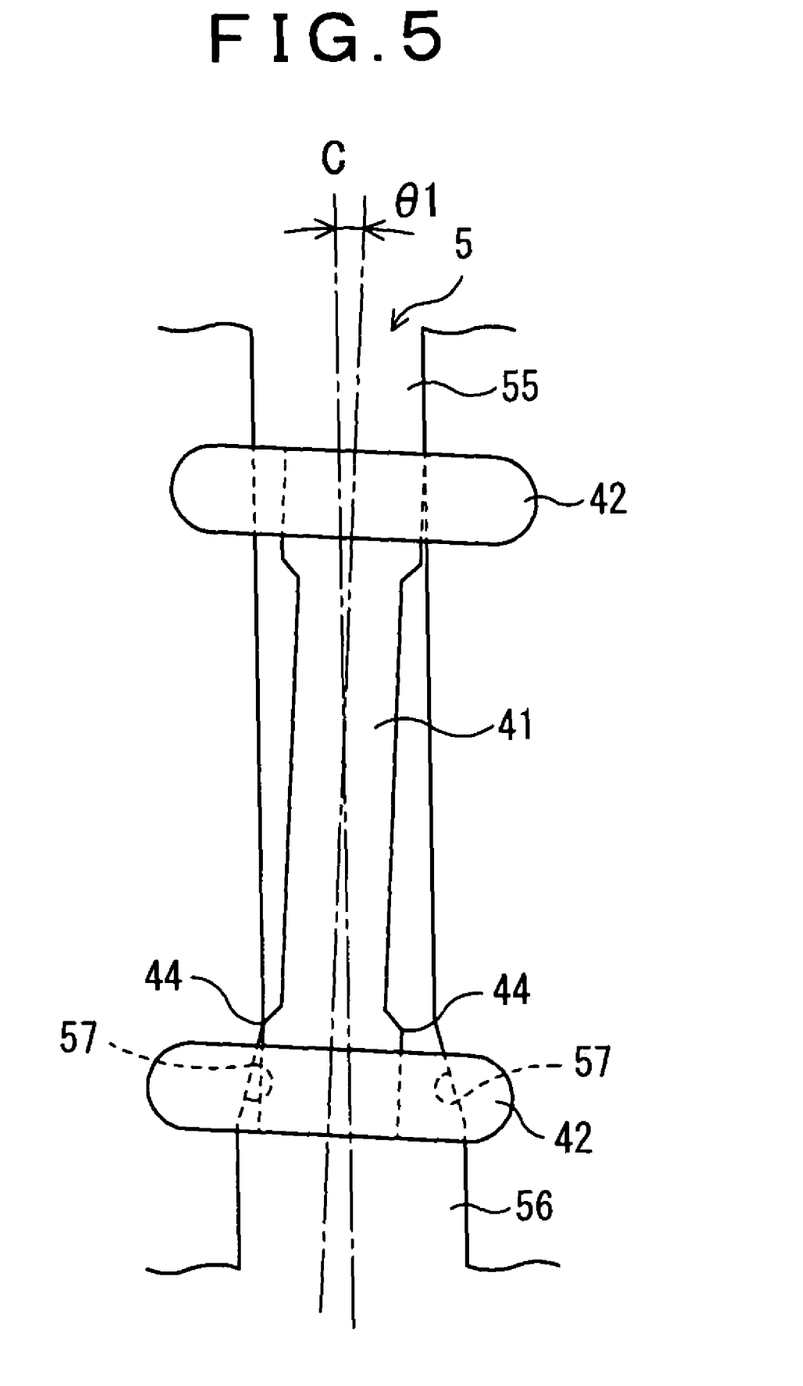
FIG. 5 is an illustrative view showing a state where the engaging body is pushed into the principal part in the guide groove.

Next will be described the operation of this disk loading apparatus with reference to FIGS. 1 and 2 to 5. It is noted that FIG. 3 is an illustrative view showing a state where the engaging body 41 is tilted in the initial part 56 in the guide groove 5; FIG. 4 is an illustrative view showing a state where the engaging body 41 slides in the initial part 56 in the guide groove 5 while being tilted and then one locking part 44 is pressed against one slant wall surface 57; and FIG. 5 is an illustrative view showing a state where the engaging body 41 is pushed into the principal part 55 in the guide groove 5.

Figure 6:
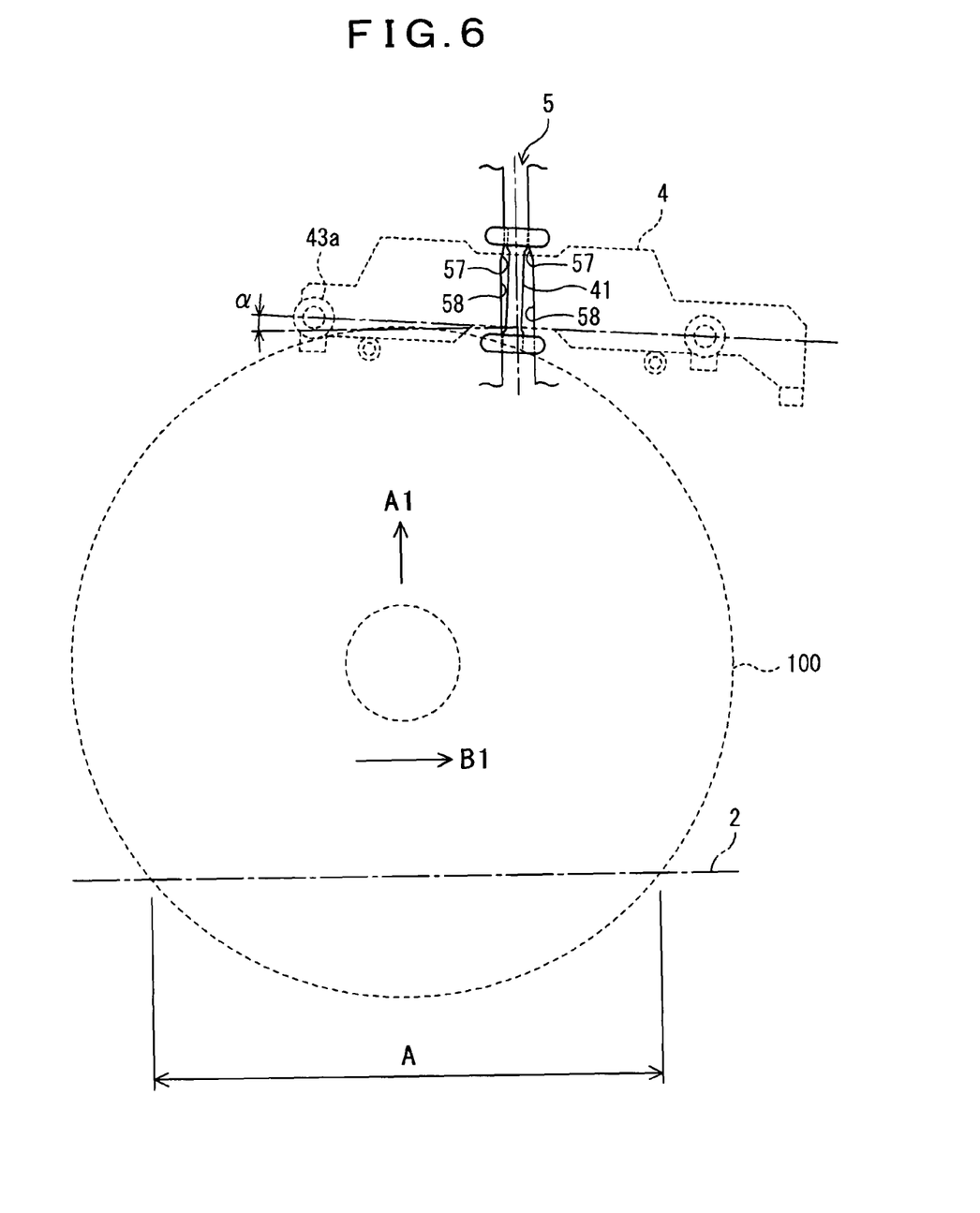
FIG. 6 is a plan view showing the operation of limiting the tilt angle of the disk arm.

When the surface of the disk 100 that is inserted through the slot 1 at a biased position comes into contact with the feed roller 2 as shown in FIG. 1, the disk 100 is drawn by the normal rotation of the feed roller 2 to be engaged with only the common disk receiving portion 43a on one side of the disk arm 4 that stands by in the initial position while keeping an unloaded state (i.e. neutral state) (refer to FIG. 6). In this state, the engaging body 41 in the disk arm 4 keeps an unloaded state (i.e. neutral state) in the initial part 56 in the guide groove 5 as shown in FIG. 2.

Next, when the drawing action of the feed roller 2 causes the disk 100 to be pressed against the common disk receiving portion 43a at a biased portion of the disk arm 4, the push-in operation of the disk 100 accordingly causes the engaging body 41 to be tilted by an angle θ together with the disk arm 4 and thereby to be brought into contact with one receiving surface 58 of the initial part 56 in the guide groove 5 as shown in FIG. 3, which limits the tilt angle of the disk arm 4. In this state, when the push-in operation of the disk 100 is further applied to the common disk receiving portion 43a, the engaging body 41 slides along the receiving surface 58 while being tilted and in contact with the receiving surface 58 to be pushed in as indicated by the arrow "a" in FIG. 3, so that one locking part 44 is pressed against one slant wall surface 57 while the engaging body 41 is tilted by the angle θ as shown in FIG. 4.

When the locking part 44 in the engaging body 41 is thus pressed against the slant wall surface 57 in the guide groove 5, the engaging body 41 is kept locked against the slant wall surface 57 so that the disk arm 4 is not retracted or the sliding resistance of the locking part 44 in the engaging body 41 increases prominently, even if the drawing action of the feed roller 2 may cause the disk 100 to push the disk arm 4 in the retracting direction (corresponding to the direction indicated by the arrow "a" in FIG. 3).

Accordingly, in the state above, the pressing state between the disk 100 that is given a force in the drawing direction by the feed roller 2 and the disk arm 4 appears normally and therefore the centering function of the feed roller 2 can also be exhibited normally and stably. Therefore, the disk 100 moves from the common disk receiving portion 43a on one side of the disk arm 4 in the centering direction while be rotated by the centering function of the feed roller 2. After the centering operation causes the center of the disk 100 to come closer to the extension C of the center line of the principal part 55 in the guide groove 5 and then the disk 100 comes into contact with the disk receiving portion 43b on the other side of the disk arm 4 shown in FIG. 1, the disk arm 4 swings in the direction of reducing the tilt angle thereof with the engaging body 41. This causes the locking part 44 in the engaging body 41 to slide along the slant wall surface 57, as shown in FIG. 5, so that the tilt angle θ1 of the engaging body 41 is made smaller than the initial tilt angle θ and the engaging body 41 is pushed into the principal part 55. Consequently, the torque disappears and the centering function of the feed roller 2 is disabled, and then the push-in operation of the disk 100 pushes the disk arm 4 with the engaging body 41 in the retracting direction. This results in that the disk 100 is drawn accurately onto the chucking position while pushing the disk arm 4.

In the present embodiment, since the guide groove 5 is formed symmetrically with respect to the center line C thereof, the foregoing drawing action and centering operation can also be exhibited similarly regardless of on which side of the slot 1 the disk 100 is inserted at a biased position.

Also, in the present embodiment, if the angle between the left and right slant wall surfaces 57 and 57, which are provided symmetrically in the initial part 56 in the guide groove 5, is increased, the locking parts 44 in the engaging body 41 become more likely to be engaged with the slant wall surfaces 57 and 57, and accordingly, the pressing state between the disk 100 and the disk arm 4 is made stable. Meanwhile, if the angle between the left and right slant wall surfaces 57 and 57 is reduced, the engaging body 41 becomes more likely to slide along the slant wall surfaces 57 and 57 accordingly. However, even if the engaging body 41 may thus become more likely to slide along the slant wall surfaces 57 and 57, there is no possibility that the engaging body 41 slides along the slant wall surfaces 57 and 57 to get into the principal part 55 in the guide groove 5. Thus, the stability of the pressing state between the disk 100 and the disk arm 4 can be ensured only by employing a simple arrangement that the guide groove 5 is partitioned into an initial part 56 and a principal part 55 and the initial part includes slant wall surfaces 57 and 57, which helps not only improve the stability in the centering operation but also promote the mass production of disk loading apparatuses.

Meanwhile, in the case of intending only to exhibit the centering operation for the disk 100 reliably by engaging the engaging body 41 with the slant wall surfaces 57 through the push-in operation of the disk 100, it is enough that the initial part 56 in the guide groove 5 includes the slant wall surfaces 57, and the initial part 56 is not necessarily required to include receiving surfaces 58 as in the present embodiment. That is, as illustrated in FIG. 8, also in the case where the entire groove wall surfaces of the initial part 56 in the guide groove 5 are formed as long slant wall surfaces 57, the engaging body 41 that is given a pushing force is engaged with the slant wall surfaces 57, as shown in the drawing, so that the stability of the pressing state between the disk 100 and the disk arm 4 can be well ensured. However, just employing this arrangement may result in an increase in the tilt angle of the disk arm 4, and accordingly, the centering operation for the disk 100 becomes impaired. Next will be described this point with reference to FIGS. 6 and 7.

Figure 7:
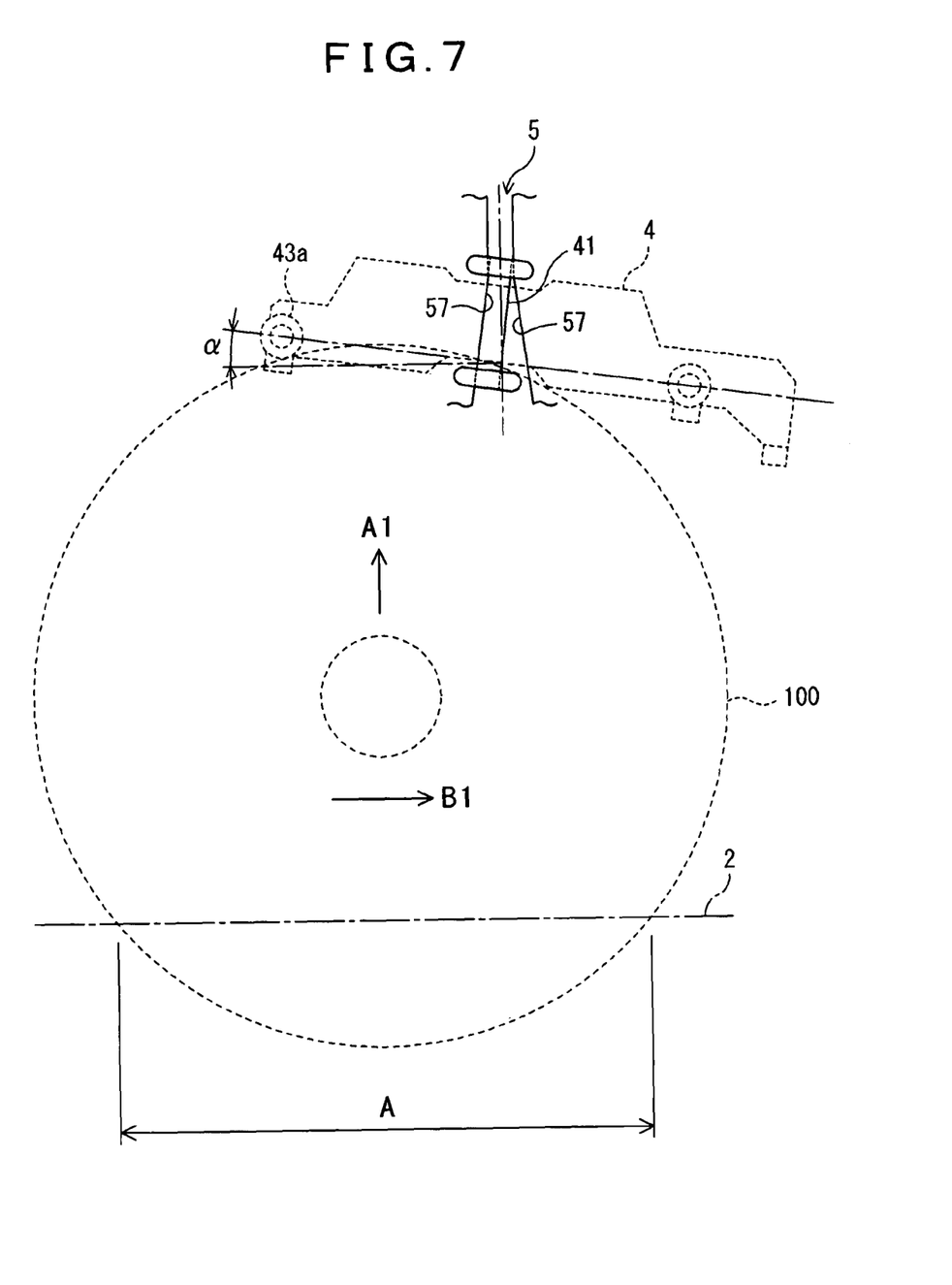
FIG. 7 is a plan view showing the operation of limiting the tilt angle in the case where the entire groove wall surfaces of the initial part in the guide groove are formed as long slant wall surfaces.
Figure 8:
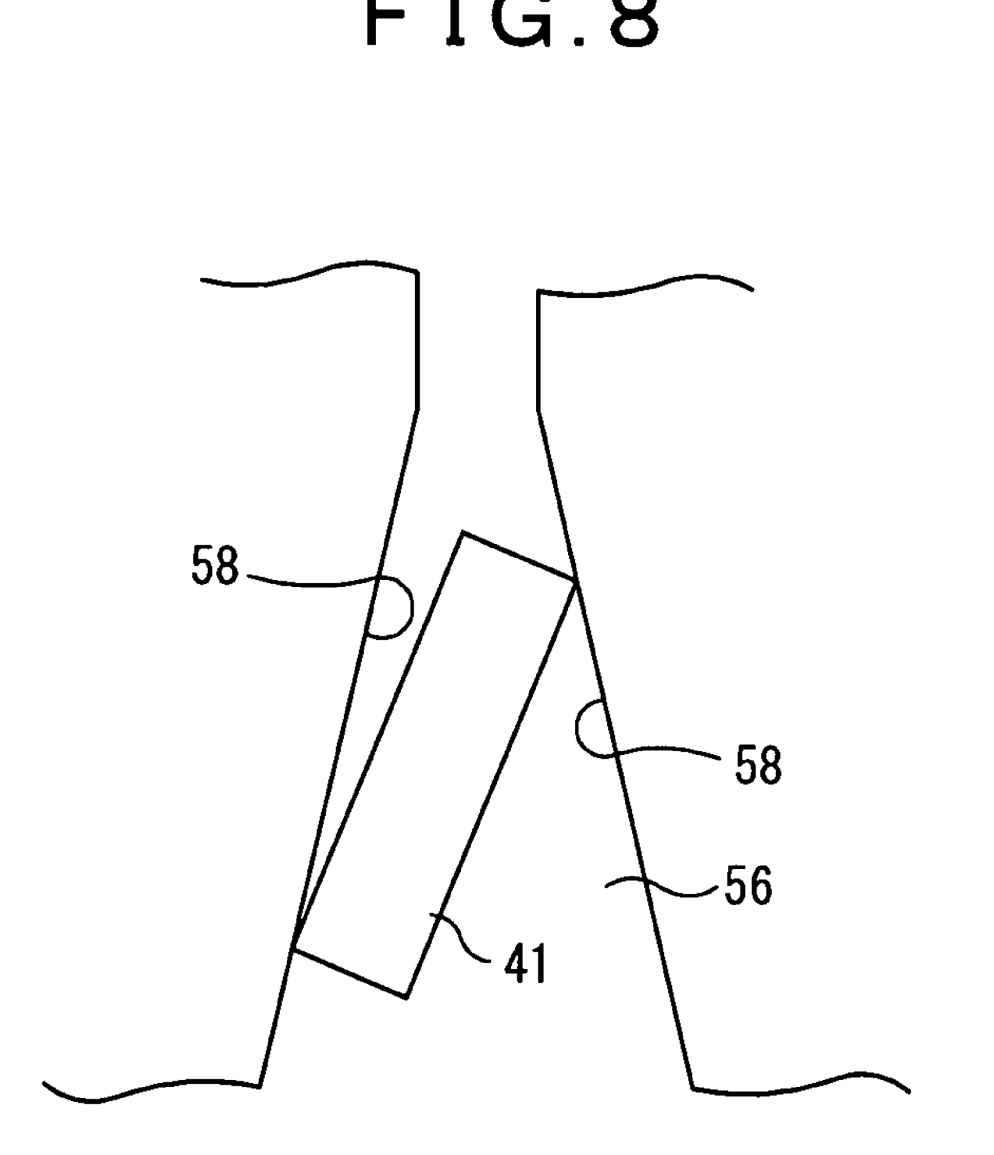
FIG. 8 is an illustrative view of the case where the entire groove wall surfaces of the initial part in the guide groove are formed as long slant wall surfaces.

FIG. 6 is a plan view showing the operation of limiting the tilt angle of the disk arm 4 to be exhibited in the present embodiment, and FIG. 7 is a plan view showing the operation of limiting the tilt angle in the case where the entire groove wall surfaces of the initial part 56 in the guide groove 5 are formed as long slant wall surfaces 57.

In the embodiment shown in FIG. 6, when the disk arm 4 is tilted in the initial part 56 in the guide groove 5 from the neutral state with the engaging body 41, the engaging body 41 comes into contact with the receiving surfaces 58 to limit the tilt angle α (tilt angle from the posture angle of the disk arm 4 when the longitudinal direction of the engaging body 41 is parallel to the center line of the guide groove 5) of the disk arm. It is therefore possible to bring the receiving surfaces 58 closer to the center line of the guide groove 5 to limit the tilt angle α. On the other hand, since the entire groove wall surfaces of the initial part 56 are formed as long slant wall surfaces 57 in the case shown in FIG. 7, the tilt angle β of the disk arm 4 when the disk arm 4 is tilted in the initial part 56 from the neutral state with the engaging body 41 cannot be limited constantly. Therefore, the amount of drawing of the disk 100 when the disk 100 is received at a biased portion (disk receiving portion 43a) of the disk arm 4 can be reduced in FIG. 6, while such an arrangement cannot be employed in FIG. 7. Meanwhile, it has been known that the feeding function in the direction indicated by the arrow A1 and centering function in the direction indicated by the arrow B1 of the feed roller 2 are exhibited more effectively as the width A of a portion of the feed roller 2 that faces the disk 100 (hereinafter referred to as "contact width") increases. Also, since the disk 100 has a circular shape, the contact width A of the feed roller 2 against the disk 100 increases as the contact portion of the feed roller 2 against the disk 100 comes closer to the center of the disk 100.

For these reasons, in such an arrangement that the engaging body 41 comes into contact with the receiving surfaces 58 to limit the tilt angle α of the disk arm 4 as in the embodiment shown in FIG. 6, the tilt angle α can be limited and the amount of drawing of the disk 100 when the disk 100 that is drawn by the feed roller 2 is received at a biased portion of the disk arm 4 can be reduced. Consequently, this has the advantage that the feeding function and centering function of the feed roller 2 can be exhibited effectively by increasing the contact width A of the feed roller 2 against the disk 100.

What is claimed is:

1. A disk loading apparatus comprising: a feed roller selectively controlled between a normal rotation for drawing a disk inserted through a slot and a reverse rotation for ejecting the disk through said slot; a disk arm adapted to move back and forth between an initial position where the disk that is drawn by the normal rotation of said feed roller is received and a retracted position that corresponds to a chucking position for the disk; and a straight guide groove for sliding an engaging body included in said disk arm to guide the back-and-forth movement of said disk arm, in which said feed roller has a centering function of moving the disk that is received by said disk arm in the axial direction of said feed roller while pressing the disk against said disk arm, and said disk arm is adapted to be retracted from said initial position to said retracted position by the push-in operation of the disk that is given a feed force by said feed roller, wherein said guide groove is partitioned into an initial part having a large groove width that corresponds to said engaging body in said disk arm positioned in said initial position and a principal part having a groove width smaller than that of said initial part, slant wall surfaces are provided at the juncture between said principal part and said initial part, the groove width between said slant wall surfaces decreasing progressively in the retracting direction of said disk arm, and said engaging body has a convex shape elongated in the longitudinal direction of said guide groove and locking parts to be locked against said slant wall surfaces are formed at a predetermined position in the longitudinal direction of said engaging body, said disk arm in said initial position being adapted to receive the disk that is drawn by said feed roller at a biased position and thereby to be tilted from the neutral state so that said locking parts are pressed against said slant wall surfaces, and further the groove wall surfaces in said initial part that run parallel to the groove wall surfaces in said principal part being adapted to come into contact with said engaging body to limit the tilt angle of said disk arm when said disk arm is tilted from the neutral state with said engaging body, and wherein the centering function of said feed roller is for moving the disk so that the center of the disk is positioned on the extension of the center line of said principal part in said guide groove.

2. A disk loading apparatus comprising: a feed roller selectively controlled between a normal rotation for drawing a disk inserted through a slot and a reverse rotation for ejecting the disk through said slot; a disk arm adapted to move back and forth between an initial position where the disk that is drawn by the normal rotation of said feed roller is received and a retracted position that corresponds to a chucking position for the disk; and a straight guide groove for sliding an engaging body included in said disk arm to guide the back-and-forth movement of said disk arm, in which said feed roller has a centering function of moving the disk that is received by said disk arm in the axial direction of said feed roller while pressing the disk against said disk arm, and said disk arm is adapted to be retracted from said initial position to said retracted position by the push-in operation of the disk that is given a feed force by said feed roller, wherein said guide groove is partitioned into an initial part that corresponds to said engaging body in said disk arm positioned in said initial position and a principal part, said initial part including slant wall surfaces with the groove width therebetween decreasing progressively in the retracting direction of said disk arm and said engaging body including locking parts to be locked against said slant wall surfaces, and said disk arm in said initial position being adapted to receive the disk that is drawn by said feed roller at a biased position and thereby to be tilted from the neutral state so that said locking parts are pressed against said slant wall surfaces, and wherein receiving surfaces adapted to come into contact with said engaging body to limit the tilt angle of said disk arm when said disk arm is tilted from the neutral state with said engaging body are provided continuously from said slant wall surfaces.

3. The disk loading apparatus according to claim 2, wherein in said guide groove, the groove width of said initial part is greater than that of said principal part, said slant wall surfaces are provided at the juncture between said principal part and said initial part, and the groove wall surfaces in said initial part that run parallel to the groove wall surfaces in said principal part are formed as said receiving surfaces.

4. The disk loading apparatus according to claim 2, wherein said engaging body has a convex shape elongated in the longitudinal direction of said guide groove.

5. The disk loading apparatus according to claim 2, wherein the centering function of said feed roller is for moving the disk so that the center of the disk is positioned on the extension of the center line of said principal part in said guide groove.

6. The disk loading apparatus according to claim 3, wherein the centering function of said feed roller is for moving the disk so that the center of the disk is positioned on the extension of the center line of said principal part in said guide groove.

7. The disk loading apparatus according to claim 4, wherein the centering function of said feed roller is for moving the disk so that the center of the disk is positioned on the extension of the center line of said principal part in said guide groove.

8. The disk loading apparatus according to claim 3, wherein said engaging body has a convex shape elongated in the longitudinal direction of said guide groove.

* * * * *